(12) United States Patent
Katoh

(10) Patent No.: US 8,757,894 B2
(45) Date of Patent: Jun. 24, 2014

(54) OPTICAL CONNECTOR AND INSERTION AND REMOVAL METHOD OF OPTICAL CONNECTOR

(75) Inventor: Seiji Katoh, Sakura (JP)

(73) Assignee: Fujikura Ltd., Tokyo (JP)

( * ) Notice: Subject to any disclaimer, the term of this patent is extended or adjusted under 35 U.S.C. 154(b) by 499 days.

(21) Appl. No.: 12/950,484

(22) Filed: Nov. 19, 2010

(65) Prior Publication Data
US 2012/0057826 A1  Mar. 8, 2012

(30) Foreign Application Priority Data

Sep. 6, 2010  (JP) .................................. 2010-198969

(51) Int. Cl.
  *G02B 6/36*  (2006.01)
(52) U.S. Cl.
  USPC .......................................................... 385/78
(58) Field of Classification Search
  USPC .......................................................... 385/78
  See application file for complete search history.

(56) References Cited

U.S. PATENT DOCUMENTS

2006/0285807 A1*  12/2006  Lu et al. ........................... 385/92
2009/0285534 A1   11/2009  Ishikawa

FOREIGN PATENT DOCUMENTS

| CN | 1071012 A | 4/1993 |
| CN | 1098507 A | 2/1995 |
| EP | 0366346 A2 | 5/1990 |
| JP | S63-43110 U | 3/1988 |
| JP | 2001-015212 A | 1/2001 |

OTHER PUBLICATIONS

Chinese Office Action dated Aug. 19, 2013, issued in Chinese Patent Application No. 201010614824.X.
Notice of Allowance issued Nov. 19, 2013 in Japanese Patent Application No. 2010-198969.

* cited by examiner

*Primary Examiner* — Uyen Chau N Le
*Assistant Examiner* — Hoang Tran
(74) *Attorney, Agent, or Firm* — Sughrue Mion, PLLC

(57) ABSTRACT

Provided is an optical connector including: a ferrule housing; a coupling, wherein the housing is insertable into the coupling; a coupling engagement member provided at a rear of the housing; and a boot formed to accommodate an optical fiber therethrough and extending rearward from the coupling engagement member. The optical connector is moveable into a first position by pressing the boot in a forward direction, thus exerting a forward pressure on the coupling engagement member and into a second position by pulling the boot in a rearward direction, thus exerting a rearward pressure on the coupling engagement member. In the first position, the coupling engagement member abuts the housing, such that the forward pressure on the coupling engagement member is exerted on the housing. In the second position, the coupling engagement member engages the coupling such that the rearward pressure on the coupling engagement member is exerted on the coupling.

6 Claims, 7 Drawing Sheets

OPTICAL CONNECTOR AND INSERTION AND REMOVAL METHOD OF OPTICAL CONNECTOR

BACKGROUND OF THE INVENTION

1. Field of the Invention

The present invention relates to an optical connector, and a method of inserting and removing the optical connector into/from a connector housing (optical connector adapter or the like).

Priority is claimed on Japanese Patent Application No. 2010-198969, filed Sep. 6, 2010, the contents of which are incorporated herein by reference.

2. Description of the Related Art

Conventionally, a multi-core optical connector (for example, an MPO type optical connector: F13 type optical connector established in JIS C5982) which engages a connector housing (optical connector adapter or the like) by a push-on method is used (for example, refer to United States Patent Application Publication No. 2009/285534).

Since adjacent connector housings are close to each other in an optical wiring board or the like in which the connector housings are arranged with a high density, it becomes difficult to insert fingers between optical connectors, and it becomes difficult to perform an insertion and removal operation of an optical connector (for example, the operation of gripping and moving rearward a coupling to remove an optical connector).

For this reason, an optical connector is proposed, in which an engagement member engageable with the coupling is provided and this engagement member is provided with an operating stick which extends rearward.

FIG. 7 shows an example of the optical connector provided with the operating stick. The optical connector 110 shown in the figure includes a connector main body 1 which has a ferrule 12 attached to a tip of the optical fiber 11, a coupling 2, an engagement member 103 engageable with the coupling 2, a boot 104, and an operating stick 105 which extends rearward from the engagement member 103.

An extending end of the operating stick 105 is formed with a head portion 105a for operation. The operating stick 105 is formed at a position deviated from the central axis of the optical connector 110 in order to avoid interfering with an optical fiber 11. Reference numeral 7 designates an optical connector adapter into/from which the optical connector 110 is inserted and removed.

In the optical connector 110, when the operating stick 105 is pulled rearward, the coupling 2 moves rearward along with the engagement member 103. Therefore, the latches 72 of the optical connector adapter 7 are released, and the optical connector 110 is removed from the optical connector adapter 7.

When the operating stick 105 is pushed forward, the engagement member 103 moves the connector main body 1 forward to insert the connector main body 1 into the optical connector adapter 7, and the latches 72 engage engagement recesses 15b of the connector main body 1.

However, in the optical connector 110, the head portion 105a of the operating stick 105 is formed at the position deviated from the central axis of the optical connector 110. Therefore, when the operating stick 105 is operated, there is a concern that a force in a direction which inclines with respect to the axial direction is applied to the optical connector 110.

Additionally, since the operating stick 105 is at the position deviated from the central axis of the optical connector 110, it is hard for an operator to recognize the tip position of the optical connector 110, and particularly, it is hard to perform the operation of inserting the optical connector 110 into the optical connector adapter 7.

The invention has been made in consideration of the above circumstances, and the object thereof is to provide an optical connector and an insertion and removal method of the optical connector in which an excessive force is not applied to the optical connector, and the workability of an insertion and removal operation is improved when an optical connector is inserted into or removed from a connector housing.

SUMMARY OF THE INVENTION

An optical connector according to an aspect of the present invention is insertable into and removable from a connector housing, the optical connector including: a housing which houses a ferrule; a coupling, wherein the housing is insertable into the coupling; a coupling engagement member provided at a rear of the housing, the coupling engagement member being movable with respect to the housing; and a boot formed to accommodate an optical fiber therethrough and extending rearward from the coupling engagement member; wherein the optical connector is moveable into a first position by pressing the boot in a forward direction, thus exerting a forward pressure on the coupling engagement member and into a second position by pulling the boot in a rearward direction, thus exerting a rearward pressure on the coupling engagement member, wherein: in the first position, the coupling engagement member abuts the housing, such that the forward pressure on the coupling engagement member is exerted on the housing, and in the second position, the coupling engagement member engages the coupling such that the rearward pressure on the coupling engagement member is exerted on the coupling.

It may be arranged such that the coupling engagement member includes a main body and a pair of extending portions extending forward from the main body, wherein the pair of extending portions connect the coupling engagement member with the coupling.

It may be arranged such that an engagement concave portion is provided on one of the coupling and the coupling engagement member, and an engagement convex portion is engageable with the engagement concave portion and is provided on the other of the coupling and the coupling engagement member, and a length of the engagement concave portion in a front-back direction is greater than a length of the engagement convex portion in a forward-backward direction, such that the engagement convex portion is moveable within the engagement concave portion.

It may be arranged such that an operation portion is formed at a rear portion of the boot and extends outward from the rear portion of the boot.

It may be arranged such that the boot is attached to the coupling engagement member via a connection member formed in a tubular shape.

It may be arranged such that the connection member includes a semi-tubular first half body and a semi-tubular second half body which face each other.

It may be arranged such that the connection member includes a fitting convex portion, and the coupling engagement member includes a fitting opening, and the connection member is attached to the coupling engagement member when the fitting convex portion fits into the fitting opening.

An insertion and removal method of inserting and removing an optical connector into/from a connector housing according to another aspect of the present invention is an insertion and removal method of an optical connector including: a housing which houses a ferrule; a coupling which surrounds the housing; a coupling engagement member provided at a rear of the housing; and a boot extending rearward from the coupling engagement member, the method including: inserting the optical connector into the connector housing, the inserting including: pressing the coupling engagement member forward by pressing the boot forward, such that the coupling engagement member is made to abut the housing at a first position, and inserting the coupling engagement member into the connector housing; and removing the optical connector from the connector housing, the removing including: pulling the coupling engagement member rearward such that the coupling engagement member engages with the coupling at a second position behind the first position, and such that the coupling is pulled rearward and the optical connector is removed from the connector housing.

An optical connector insertable into and removable from a connector housing according to another aspect of the present invention includes: a housing which houses a ferrule; a coupling, wherein the housing is insertable into the coupling; a coupling engagement member provided at a rear of the housing, the coupling engagement member being movable with respect to the housing; and a boot including an opening formed to accommodate an optical fiber therethrough and extending rearward from the coupling engagement member; wherein the boot includes a body which is substantially radially symmetric with respect to a central axis and an operation portion which extends outward from the rear of the body, and wherein the optical connector is moveable into a first position by pressing the boot in a forward direction, thus exerting a forward pressure on the coupling engagement member and into a second position by pulling the boot in a rearward direction, thus exerting a rearward pressure on the coupling engagement member.

An apical connector insertable into and removable from a connector housing according to another aspect of the present invention includes: a housing which houses a ferrule; a coupling, wherein the housing is insertable into the coupling; and a coupling engagement member provided at a rear of the housing, wherein the coupling engagement member is engaged with the coupling via an engagement member, and wherein the coupling engagement member is moveable in forward and rearward directions with respect to the housing; wherein the optical connector is moveable into a first position by pressing the coupling engagement member in a forward direction and into a second position by pulling the coupling engagement member in a rearward direction, wherein: in the first position, the coupling engagement member abuts the housing, such that the forward pressure on the coupling engagement member is exerted on the housing, and in the second position, the coupling engagement member engages the coupling such that the rearward pressure on the coupling engagement member is exerted on the coupling.

According to the above aspect of the present invention, the boot is attached to the coupling engagement member, the coupling engagement member is able to press the housing forward at the first position and is able to engage the coupling at the second position, thereby pulling the coupling rearward. Thus, the insertion and removal operation of the optical connector is made possible by operating the boot.

Since the boot is a tubular member through which the optical fiber is inserted, the position where a force is applied to the connector main body and the coupling gets close to the central axis of the optical connector. For this reason, an excessive force (e.g., a force in a direction which inclines with respect to the central axis) is not applied to the optical connector.

Additionally, since the boot is a tubular member through which the optical fiber is inserted, the boot is at a position near the central axis of the optical connector. For this reason, an operator may easily recognize the tip position of the optical connector, for example, during the operation of inserting the optical connector into the connector housing.

Accordingly, the workability of an insertion and removal operation of the optical connector is improved even in an optical wiring board or the like where the connector housings are arranged with a high density.

DETAILED DESCRIPTION OF THE INVENTION

An optical connector embodying the present invention will be described below with reference to the drawings.

Figure 1:
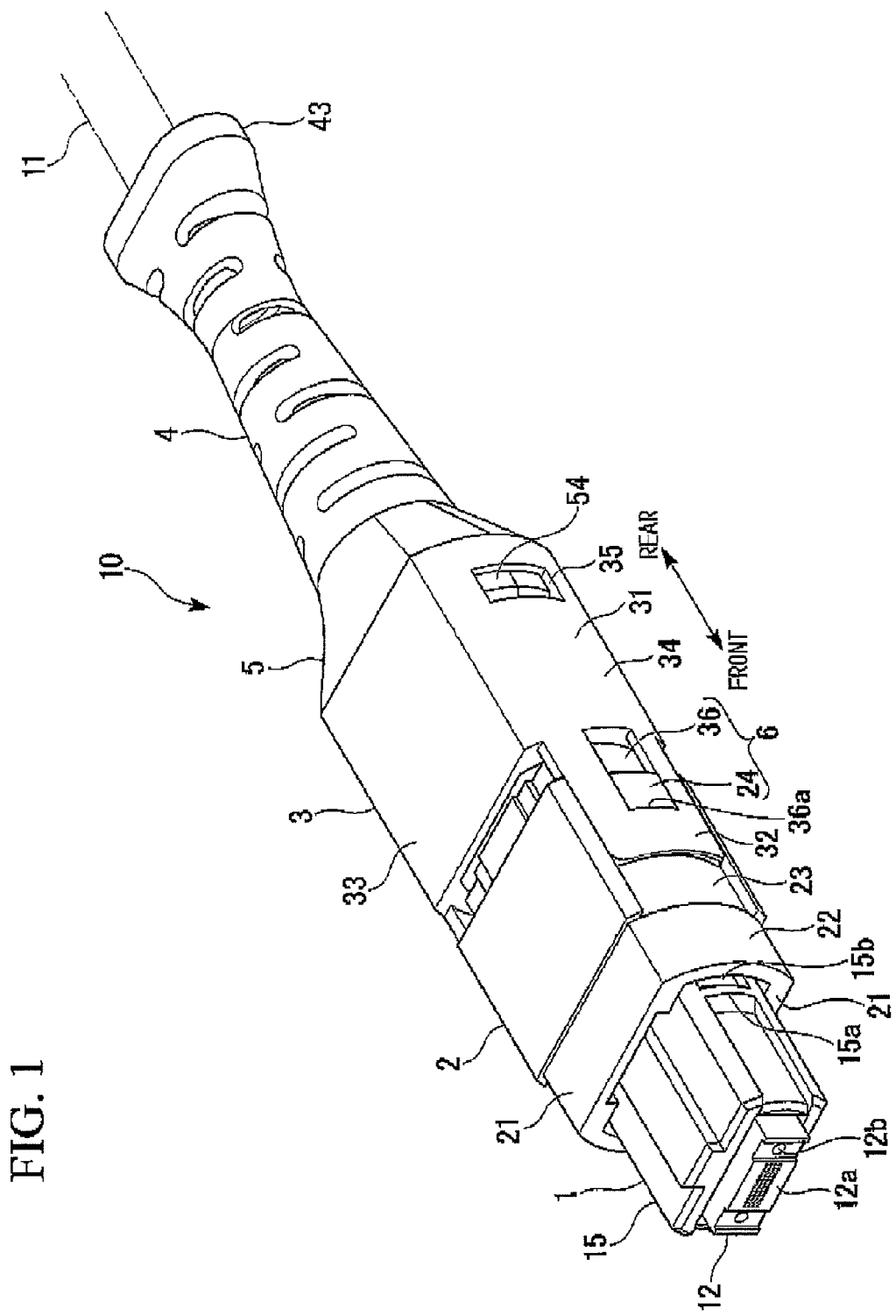
FIG. 1 is an overall perspective view showing an optical connector according to an embodiment of the present invention.
Figure 2:
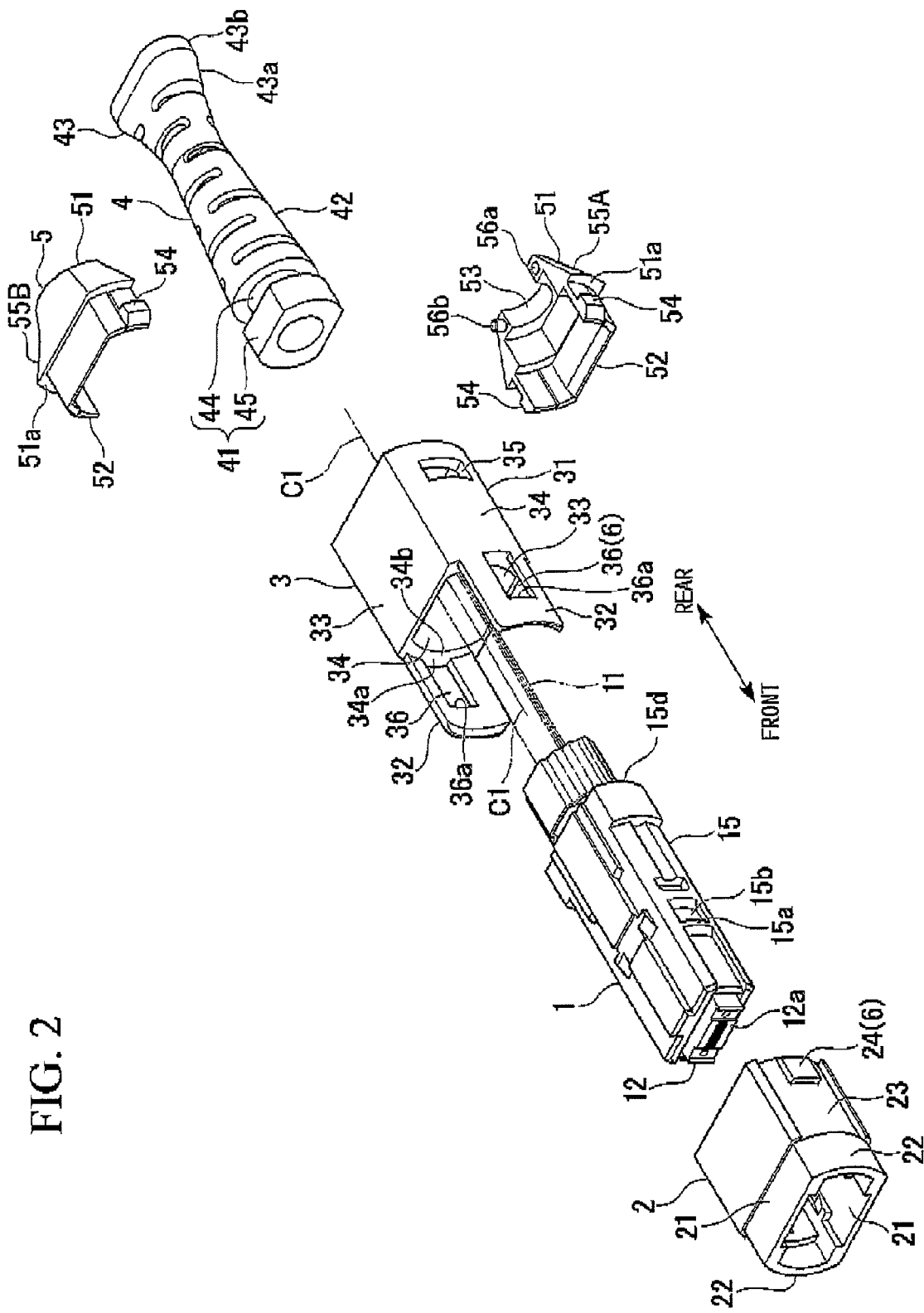
FIG. 2 is an exploded perspective view illustrating the configuration of the optical connector of FIG. 1.
Figure 3:
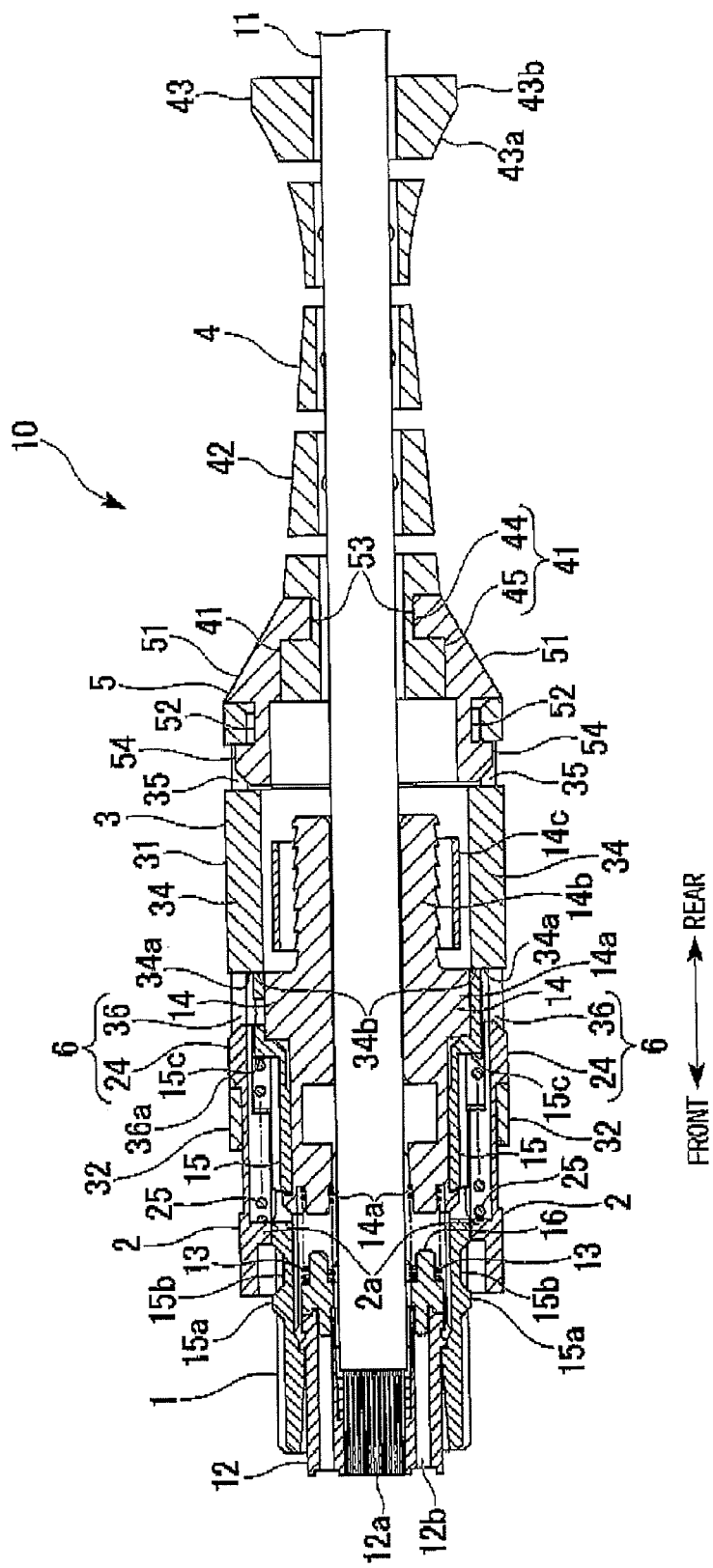
FIG. 3 is a sectional view of the optical connector of FIG. 1.

FIG. 1 is a perspective view showing an optical corrector 10 according to an embodiment of the present invention. FIG. 2 is an exploded perspective view of the optical connector 10. FIG. 3 is a sectional view of the optical connector 10.

Hereinafter, the positional relationship of constituent members may be described with reference to the "front" and the "rear" in FIGS. 1 to 3. Additionally, the "axial direction" of a tubular member means the direction of the central axis of the member. In FIG. 2, C1 is the central axis of a housing 15, a coupling 2, and a coupling engagement member 3, and the direction of the central axis coincides with a front-back direction.

As shown in FIG. 1, the optical connector 10 includes a connector main body 1, a coupling 2 movable back and forth with respect to the connector main body 1, a coupling engagement member 3 provided at the rear of the connector main body 1, a boot 4 extending rearward from the coupling engagement member 3, and a connection member 5 which connects the boot 4 to the coupling engagement member 3.

In the optical connector 10, the structure of an MPO (Multi-fiber Push On) type optical connector can be adopted (F13 type optical connector established in JIS C5982).

As shown in FIGS. 2 and 3, the connector main body 1 includes a ferrule 12 (optical ferrule) attached to a tip of the optical fiber 11, a spring 13 (for example, coil spring; refer to FIG. 3) which elastically biases the ferrule 12 forward, an abutting member 14 (refer to FIG. 3) which a rear end of the spring 13 abuts, and a tubular housing 15 which houses these members.

The ferrule 12 is, for example, a multi-core connector, such as an MT type optical connector, and a front face thereof is used as a joint end face 12a. A spring receptacle 16 is provided on the rear side of the ferrule 12. The ferrule 12 is formed with a guide pinhole 12b into which a guide pin (not shown in the figures) is inserted.

A front end of the spring 13 abuts the spring receptacle 16. The spring 13 can take the reaction force at a receptacle portion 14a of the abutting member 14, and bias the ferrule 12 forward via the spring receptacle 16.

The abutting member 14 has a main body 14a which is fitted into the housing 15 from the rear end, and an extending portion 14b extending rearward from the main body 14a. Reference numeral 14c of FIG. 3 designates a crimping ring which crimps and fixes a tensile strength fiber to the extending portion 14b, when the tensile strength fiber is used for the optical fiber 11.

An outside surface of the housing 15 is formed with engagement protrusions 15a, and an engagement recess 15b is provided to rearward of each engagement protrusion 15a, the engagement recess 15b engageable with a latch protrusion 72a of a latch 72 of an optical connector adapter 7 which will be described later.

As shown in FIG. 2, the coupling 2 has a pair of flat plate portions 21 (substrate portions) which is made into a tubular shape surrounding the housing 15 and is parallel to each other, and lateral plate portions 22 which are provided at both lateral edges of the flat plate portions 21 thereof. The lateral plate portions 22 and 22 are formed so as to face each other.

Each lateral plate portion 22 is made into a shape which is curved substantially in the shape of a circular arc in cross-section, and an outer surface thereof is formed with a grooved guide portion 23 along the front-back direction.

The guide portions 23 are formed at both of the side plate portions 22, and an engagement convex portion 24 which constitutes an engagement structure 6, which will be described later, is formed at the bottom of each guide portion 23. The engagement convex portion 24 is a protrusion having a rectangular shape in plan view.

The coupling 2 is slidingly movable back and forth with respect to the housing 15, and glidingly moves rearward with respect to the housing 15, thereby enabling the engagement of the latch 72 (refer to FIGS. 4 to 6) of the optical connector adapter 7 with the housing 15 to be released.

A mechanism (so-called push-on mechanism) which switches engagement retention and engagement release with respect to the optical connector adapter by the sliding movement of the coupling 2 will be described later.

The coupling 2 is biased forward with respect to the housing 15 by the spring 25.

The spring 25 takes the reaction force at a stepped portion 15c formed at the outer surface of the housing 15, and biases an abutting protrusion 2a formed at the inner surface of the coupling 2 (refer to FIG. 3).

The coupling engagement member 3 includes a tubular main body 31 and a pair of extending portions 32 which extends forward from the main body 31, and is movable back and forth with respect to the connector main body 1 and the coupling 2.

It is preferable that the coupling engagement member 3 have sufficient rigidity by being formed from hard resin, for example, polyethylene, polypropylene, or the like.

The main body 31 has a pair of flat plate portions 33 (substrate portions) which are parallel to each other, and lateral plate portions 34 which are provided at both lateral edges of the flat plate portions 33.

The lateral plate portions 34 are curved substantially in the shape of a circular arc in cross-section, and are formed a little more thickly than the flat plate portions 33.

The lateral plate portions 34 and 34 are formed so as to face each other.

As shown in FIG. 3, a front end (an abutting portion 34b which is an inner circumferential portion of an end face of a front end 34a of each lateral plate portion 34 in the illustrated example) of the main body 31 is capable of abutting a rear end portion of the housing 15. In addition, in the main body 31, a front end of each flat plate portion 33 may be capable of abutting the rear end portion of the housing 15.

A rear portion of each lateral plate portion 34 is formed with a fitting opening 35 into which a fitting convex portion 54 of the connection member 5, which will be described later, fits.

Each extending portion 32 extends forward from front ends 34a of each of the pair of lateral plate portions 34, and is formed in the shape of a plate having substantially a circular-arc cross-section. The extending portion 32 is thinner than each lateral plate portion 34, and the outer surface thereof is formed along the outer surface of the lateral plate portion 34.

The extending portion 32 is arranged so as to be movable in the front-back direction within the guide portion 23 of the coupling 2.

The extending portion 32 is movable in the front-back direction in a state where the movement thereof in an up-and-down direction (width direction of the extending portion 32) is restricted by the guide portion 23.

The pair of extending portions 32 are formed with engagement openings 36 (engagement concave portions).

The length of each engagement opening 36 in the front-back-direction is greater than the length of each engagement convex portion 24 in the front-back direction, and thereby, the coupling engagement member 3 is movable back and forth relative to the coupling 2 in a state where the engagement convex portion 24 has entered the engagement opening 36.

The length of the engagement opening 36 in the up-and-down direction can be made almost equal to or a little greater than that of the engagement convex portion 24 of the coupling 2.

The engagement opening 36, and the engagement convex portion 24 of the coupling 2 constitute the engagement structure 6 in which the portions are engageable with each other. The engagement structures 6 are respectively provided at both lateral portions of the coupling 2 and the coupling engagement member 3.

In addition, the engagement structure between the coupling and the coupling engagement member is not limited to this, and may be a structure including an engagement concave portion formed at the coupling and an engagement convex portion formed at the coupling engagement member. Even in this case, the length of the engagement concave portion in the front-back direction is greater than the length of the engagement convex portion in the front-back direction, and the engagement convex portion is relatively movable in a state where the engagement convex portion has entered the engagement concave portion.

The boot 4 is a tubular member through which the optical fiber 11 connected to the ferrule 12 is inserted, and can be formed from, for example, rubber, polyethylene, or the like. It is preferable that the boot 4 has flexibility to such a degree that bending deformation is permitted.

The boot 4 has a front end protrusion 41, a tapered tubular portion 42 of which the diameter becomes gradually smaller rearward from the front end protrusion 41, and an operation portion 43 which is formed at a rear end portion of the tapered tubular portion 42.

The front end protrusion 41 has a tubular smaller diameter portion 44 which protrudes from a front end of the tapered tubular portion 42, and a larger diameter portion 45 which is provided at a front end of a neck 44. The smaller diameter portion 44 is made smaller than a front end portion of the tapered tubular portion 42.

The operation portion 43 makes it easy to apply a pressing force to the boot 4 when an operator presses the boot 4 in the front-back direction for insertion and removal operation of the optical connector 10, and is made into a shape which overhangs outward, i.e., of which the width or height is greater than that the tapered tubular portion 42. In the illustrated example, the operation portion 43 has an enlarged diameter portion 43a of which width and height become gradually larger rearward from the rear end of the tapered tubular portion 42, and a constant diameter portion 43b with a constant external diameter formed behind the enlarged diameter portion 43a.

The connection member 5 is a tubular member through which the optical fiber 11 is inserted and has a tubular main body 51, and an insertion tubular portion 52 which extends forward from a front end 51a of the tubular main body 51. It is preferable that the connection member 5 have sufficient rigidity by being formed from hard resin, for example, polyethylene, polypropylene, or the like.

An inner surface of a rear end portion of the main body 51 is formed with a locking protrusion 53 which protrudes inward. The locking protrusion 53 is arranged at the rear of the larger diameter portion 45 of the boot 4, and is locked to the rear face of the larger diameter portion 45, thereby restricting rearward movement of the boot 4. The locking protrusion 53 also has the function of restricting forward movement of the boot 4 by abutting a front end face of the tapered tubular portion 42.

A fitting convex portion 54 capable of fitting into each fitting opening 35 of the coupling engagement member 3 is formed on an outer surface of the insertion tubular portion 52 so as to protrude outward.

The insertion tubular portion 52 is inserted into the main body 31 of the coupling engagement member 3 from the rear. The insertion tubular portion 52 is attached to the coupling engagement member 3 by fitting the fitting convex portion 54 into the fitting opening 35.

As shown in FIG. 2, the connection member 5 can be configured such that substantially a semi-tubular first half body 55A and substantially a semi-tubular second half body 55B obtained by splitting the connection member 5 into two along the axial direction are combined together so as to face each other.

By forming a fitting hole 56a and a fitting projection 56b in the first half body 55A and by forming the second half body 55B with a fitting projection (not shown in the figures) to fit into the fitting hole 56a and a fitting hole (not shown in the figures) into which the fitting projection 56b fits, the positioning of the first half body 55A and the second half body 55B can be facilitated.

Although the optical fiber 11 is not particularly limited, multi-core optical fibers of optical fiber tape care wires, such as four cores, eight cores, and twelve cores, can be employed. The optical fiber 11 in the illustrated example includes a plurality of stacked optical fiber tape core wires.

Next, the operation of inserting and removing the optical connector 10 into/from the optical connector adapter 7 (connector housing) will be described referring to FIGS. 4 to 6.

In the respective drawings, a pair of latches 72 is formed in the main body 71 of the optical connector adapter 7, the main body 71 having an insertion opening 73.

First, the insertion operation of the optical connector 10 will be described.

Figure 4:
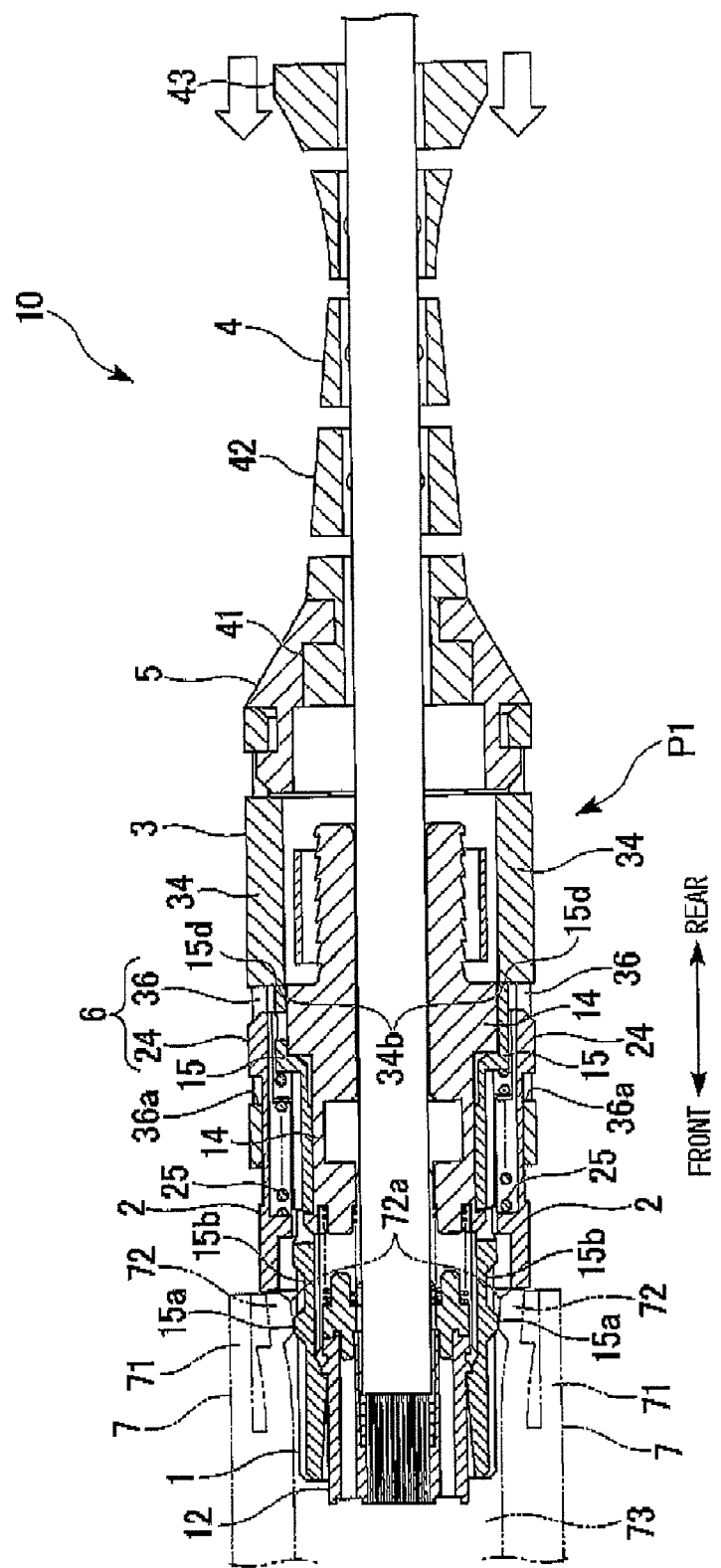
FIG. 4 is an explanatory view illustrating the operation of the optical connector of FIG. 1.

As shown in FIG. 4, the connector main body 1 is brought close to the optical connector adapter 7, and is inserted into the insertion opening 73.

This insertion operation can be performed by gripping the boot 4. The grip position can be the operation portion 43 of the rear end of the boot 4.

When the boot 4 is pressed forward, the pressing force is transmitted to the coupling engagement member 3, and the front end (abutting portions 34b of the lateral plate portions 34 in the illustrated example) of the main body 31 applies a forward force to a rear end 15d of the housing 15, whereby the connector main body 1 moves forward.

Hereinafter, the position (position where the abutting portions 34b of the lateral plate portions 34 abut the housing 15) of the coupling engagement member 3 shown in FIG. 4 is referred to as a first position P1.

In the state shown in FIG. 4, the engagement convex portions 24 of the coupling 2 are at a position separated from front edges 36a (that is, the coupling engagement member 3 and coupling 2 are in a non-engagement state) within the engagement openings 36. In this state, the coupling 2 and the coupling engagement member 3 are freely movable back and forth relative to each other within a range where the engagement convex portions 24 can move in the engagement openings 36.

By the forward movement of the connector main body 1, the engagement protrusions 15a of the housing 15 displace the latches 72 outward (a direction in which the distance between the latches 72 increases). The displaced latches 72 restrict the advance of the coupling 2.

Figure 5:
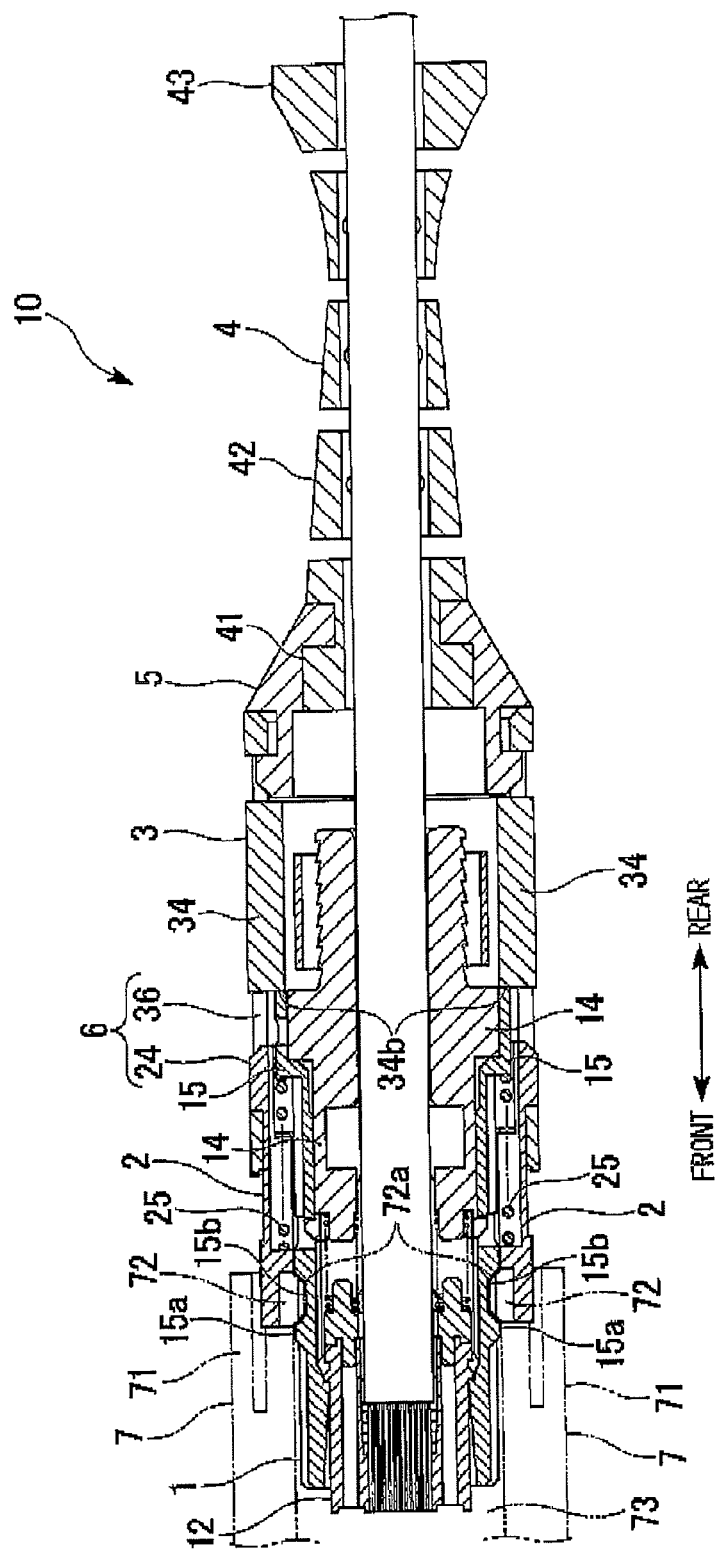
FIG. 5 is an explanatory view illustrating the operation of the optical connector of FIG. 1.

As shown in FIG. 5, while the advance of the coupling 2 is restricted, the housing 15 moves forward. Therefore, the engagement recesses 15b are exposed, the latches 72 are displaced inward, and the latch protrusions 72a engage the engagement recesses 15b.

Since the advance restriction of the coupling 2 is released by the inward displacement of the latches 72, the coupling 2 is moved forward by the elastic forces of the springs 25.

FIG. 5 shows a state where the insertion of the optical connector 10 into the optical connector adapter 7 is completed.

Next, the removal operation of the optical connector 10 will be described.

Figure 6:
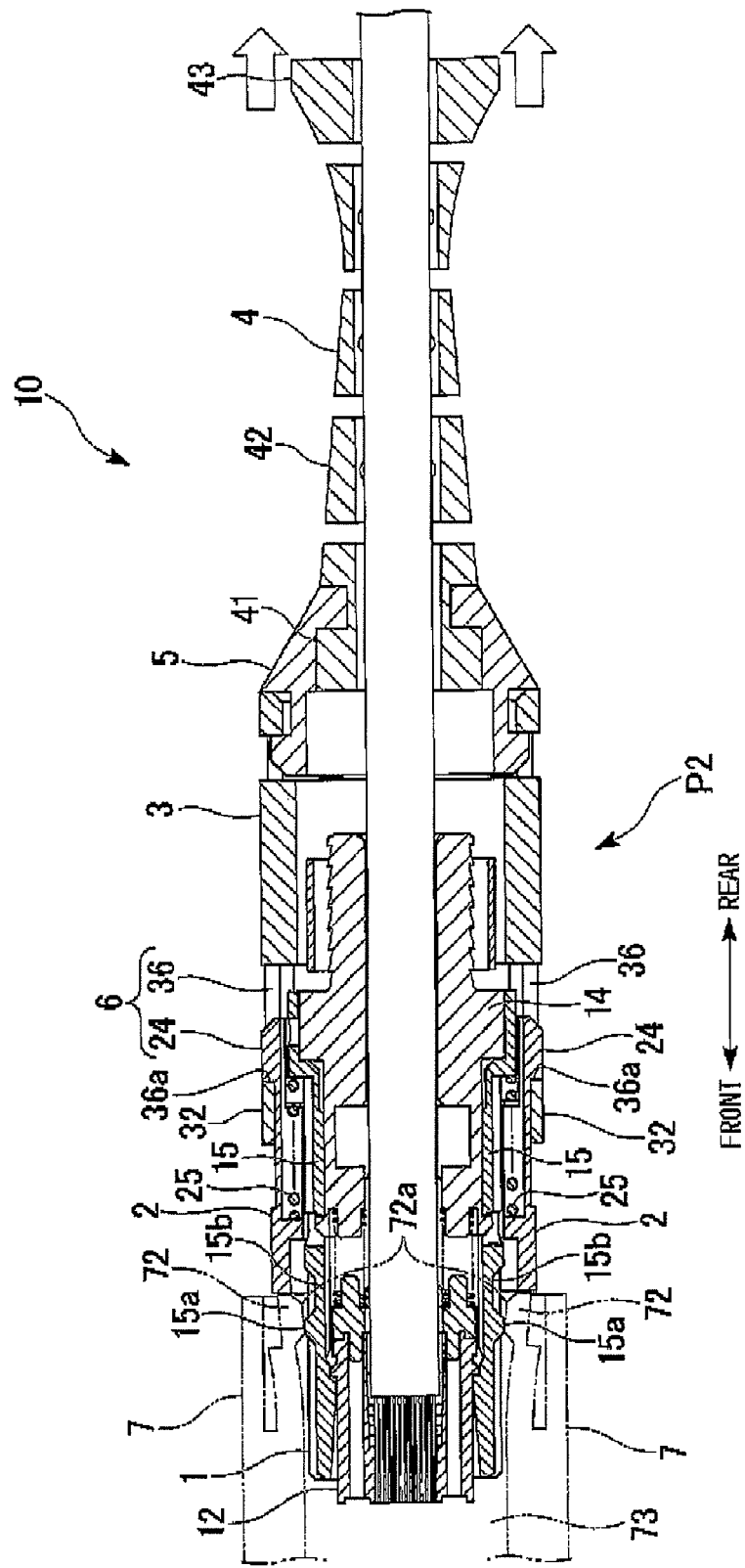
FIG. 6 is an explanatory view illustrating the operation of the optical connector of FIG. 1.
Figure 7:
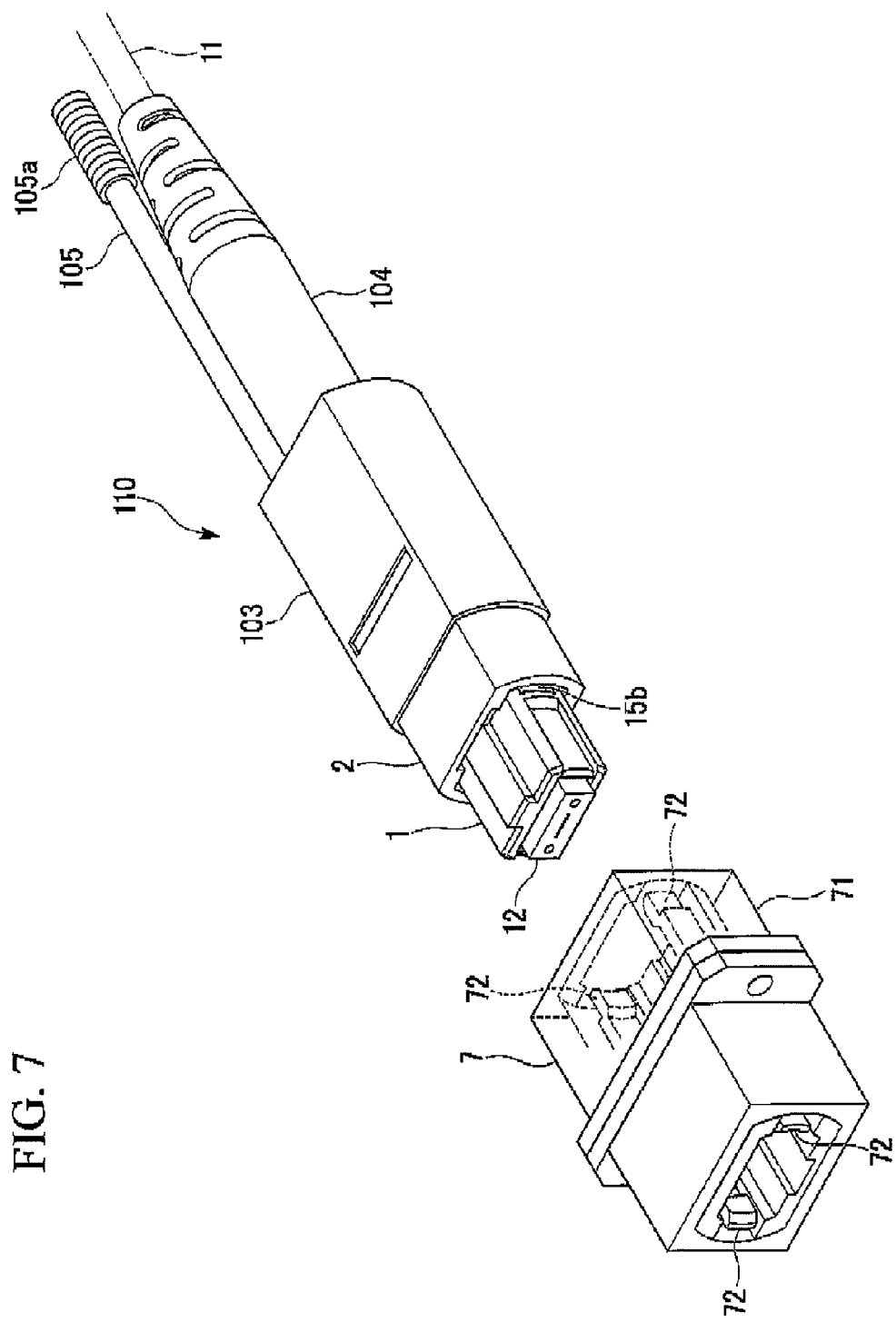
FIG. 7 is an overall perspective view showing an example of a conventional optical connector.

As shown in FIG. 6, the removal operation can be performed by gripping the boot 4. The grip position can be the operation portion 43 of the rear end of the boot 4.

When the boot 4 is pulled rearward, the pulling force is transmitted to the coupling engagement member 3, and the front edges 36a of the engagement openings 36 formed at the extending portions 32 apply a rearward force to the engagement convex portions 24 of coupling 2, whereby the coupling 2 moves rearward.

By the rearward movement of the coupling 2, the engagement recesses 15b of housing 15 are exposed, and the latches 72 are brought into a state where the latches are capable of being displaced outward.

When the coupling 2 is further moved rearward, a rearward force is applied to the connector main body 1 by the springs 25, the connector main body 1 also begins to move rearward, the engagement protrusions 15a displace the latches 72 outward, and the engagement of the latch protrusions 72a with the engagement recesses 15b is released.

When the boot 4 is further pulled rearward, the coupling engagement member 3 is separated from the optical connector adapter 7, and the whole optical connector 10 is removed from the optical connector adapter 7.

The position (the position of the coupling engagement member 3 relative to the connector main body 1) of the coupling engagement member 3 shown in FIG. 6 is referred to as a second position P2.

The second position P2 is behind the first position P1. At this second position, the front edges 36a of the engagement openings 36 abut the engagement convex portions 24 of the coupling 2 (that is, the coupling engagement member 3 engages the coupling 2 by the engagement structure 6). Thus, the rearward force can be applied to the engagement convex portions 24.

In the optical connector 10, the boot 4 is attached to the coupling engagement member 3, the coupling engagement member 3 is able to press the housing 15 forward at the first position P1 (refer to FIG. 4), and is able to engage the coupling 2 at the second position P2 thereby pulling the coupling rearward (refer to FIG. 6). Thus, the insertion and removal operation of the optical connector 10 is made possible by operating the boot 4.

Since the boot 4 is a tubular member through which the optical fiber 11 is inserted, the position where a force is applied to the corrector main body 1 and the coupling 2 becomes close to the central axis of the optical connector 10. For this reason, an excessive force (for example, a force in a direction which inclines with respect to the central axis) is not applied to the optical connector 10.

Additionally, since the boot 4 is a tubular member through which the optical fiber 11 is inserted, the boot is at a position near the central axis of the optical connector 10. For this reason, an operator may easily recognize the tip position of the optical connector 10, for example, at the operation of gripping the boot 4 and inserting the optical connector 10 into the optical connector adapter 7.

Accordingly, the workability of insertion and removal operation of the optical connector 10 is improved even in an optical wiring board or the like where the optical connector adapter 7 is arranged with a high density.

The present invention can also be broadly applied to optical connectors for multi cores or a single core other than the MPO type optical connectors. Additionally, a connector housing serving as a connection target of an optical connector is not limited to the optical connector adapter, and may be an optical connector receptacle. Although a multi-core optical fiber, such as an optical fiber tape core wire, has been exemplified as the optical fiber, a single-core optical fiber core wire or the like can be employed.

While preferred embodiments of the invention have been described and illustrated above and it should be understood that these are exemplary of the invention and are not to be considered as limiting. Additions, omissions and substitutions, and other modifications can be made without departing from the scope of the present invention. Accordingly, the invention is not to be considered as being limited by the foregoing description, and is only limited by the scope of the appended claims.

What is claimed is:

1. An optical connector insertable into and removable from an optical connector adapter, the optical connector comprising: a housing which houses a ferrule; a coupling attached to the housing by inserting the housing into the coupling; a coupling engagement member attached to a rear of the housing by inserting the housing into the coupling engagement member, the coupling engagement member being movable in a forward direction and a rearward direction with respect to the housing and the coupling engagement member being connected to the coupling; and a boot formed to accommodate an optical fiber therethrough and attached to the coupling engagement member so as to extend rearward from the coupling engagement member, wherein the coupling engagement member can exert a forward pressure on the housing by pressing the boot in the forward direction, thereby a latch of the optical connector adapter can be attached to the housing, wherein the coupling engagement member can exert a rearward pressure on the coupling by pulling the boot in the rearward direction thereby the latch of the optical connector adapter can be detached from the housing, wherein the boot is attached to the coupling engagement member via a connection member formed in a tubular shape, and wherein the connection member comprises a fitting convex portion, and the coupling engagement comprises a fitting opening and the connection member is attached to the coupling engagement member when the fitting convex portion fits into the fitting opening.

2. The optical connector according to claim 1,
wherein the coupling engagement member comprises a main body and a pair of extending portions extending forward from the main body,
wherein the pair of extending portions connect the coupling engagement member with the coupling.

3. The optical connector according to claim 1,
wherein an engagement concave portion is provided on one of the coupling and the coupling engagement member, and an engagement convex portion is engageable with the engagement concave portion and is provided on the other of the coupling and the coupling engagement member,
a length of the engagement concave portion in a front-back direction is greater than a length of the engagement convex portion in a forward-backward direction, such that the engagement convex portion is moveable within the engagement concave portion.

4. The optical connector according to claim 1,
wherein an operation portion is formed at a rear portion of the boot and extends outward from the rear portion of the boot.

5. An optical connector insertable into and removable from an optical connector adapter, the optical connector comprising: a housing which houses a ferrule; a coupling attached to the housing by inserting the housing into the coupling; a coupling engagement member attached to a rear of the housing by inserting the housing into the coupling engagement member, the coupling engagement member being movable in a forward direction and a rearward direction with respect to the housing and the coupling engagement member being connected to the coupling; and a boot comprising an opening formed to accommodate an optical fiber therethrough and attached to the coupling engagement member so as to extend rearward from the coupling engagement member, wherein the boot comprises a body which is substantially radially symmetric with respect to a central axis and operation portion which extends outward from the rear of the body, wherein the coupling engagement member can exert a forward pressure on the housing by pressing the boot in the forward direction, thereby a latch of the optical connector adapter can be attached to the optical connector, wherein the coupling engagement member can exert a rearward pressure on the coupling by pulling the boot in the rearward direction thereby the latch of the optical connector adapter can be detached from the housing wherein the boot is attached to the coupling engagement member via a connection member formed in a tubular shape, and wherein the connection member comprises a fitting convex portion, and the coupling engagement member comprises a fitting opening and the connection member is attached to the coupling engagement member when the fitting convex portion fits into the fitting opening.

6. An optical connector insertable into and removable from an optical connector adapter, the optical connector comprising:

- a housing which houses a ferrule;
- a coupling attached to the housing by being inserted into the coupling;
- a coupling engagement member attached to a rear of the housing by being inserted into the housing, the coupling engagement member being movable in a forward direction and a rearward direction with respect to the housing and the coupling engagement member being connected to the coupling; and
- a boot comprising an opening formed to accommodate an optical fiber therethrough and attached to the coupling engagement member so as to extend rearward from the coupling engagement member,
- wherein the boot comprises a body which is substantially radially symmetric with respect to a central axis and an operation portion which extends outward from the rear of the body,
- wherein the coupling engagement member can exert a forward pressure on the housing by pressing the boot in the forward direction, thereby a latch of the optical connector adapter can be attached to the optical connector; and
- wherein the coupling engagement member can exert a rearward pressure on the coupling by pulling the boot in the rearward direction thereby
- the latch of the optical connector adapter can be detached from the housing.

* * * * *